INVENTORS:
RICHARD F. GROSSMAN
CHARLES S. WEBBER

United States Patent Office 3,342,625
Patented Sept. 19, 1967

3,342,625
MALEAMIC ACID-VINYL COPOLYMER RELEASE AGENT FOR PRESSURE-SENSITIVE ADHESIVE TAPE
Richard F. Grossman, Albany, and Charles S. Webber, Loudonville, N.Y., assignors to Norton Company, Troy, N.Y., a corporation of Massachusetts
Filed Aug. 11, 1964, Ser. No. 388,907
4 Claims. (Cl. 117—68.5)

ABSTRACT OF THE DISCLOSURE

Copolymers of N-substituted long, straight chain alkyl maleamic acids with vinyl co-monomers form release agents for pressure-sensitive adhesive tapes. The vinyl co-monomer provides a polar pendant group and is present in a 3:1 to 2:3 mol ratio with the alkyl maleamic acid.

---

The present invention relates in general to pressure-sensitive adhesive tapes and more particularly to a new and improved type of relase agent for such tapes and to tapes made with such new release agents.

Essentially, a pressure-sensitive adhesive tape has two principal components—a normally tacky pressure-sensitive adhesive and a backing member to support the adhesive. As a practical matter however, two additional coatings are usually required in order to produce a commercially acceptable pressure-sensitive adhesive tape. The first of these is usually referred to as a "primer" coat and is required in many instances in order to achieve satisfactory bonding between the adhesive and the backing member. The second of these, and the one with which the present invention is primarily concerned is the so-called "backsize" or "release coating."

Pressure-sensitive adhesive tapes are designed to adhere to many varied types of surfaces. Among these surfaces is the backing of the tape itself. In most, if not all, uses of tapes of this type, it frequently is necessary or desirable to overlap the tape and to cause it to adhere to the backing of the same or a similar piece of tape. This, in itself, is no problem since adhesive formulations may be varied to reach many different degrees of adhesion to many different surfaces. However, the problem arises when one considers that the tape is put up for sale to the consumer in the form of rolls wherein each adhesive surface of the tape is tightly pressed against the back of the preceding convolution of tape on the roll. Since the tape must be designed to adhere satisfactorily to the backing when overlapped in use, this tends to cause "blocking" or "freezing" of the tape on the roll and hence to inhibit or to prevent easy unwind of the tape from the roll for use.

Because of the problem inherent in the striking of a balance between self-adhesion and quick release characteristics, the use of so-called "release agents" or release coatings has become widespread. The release agent is generally incorporated in the backsize composition, but where incompatible with the other components of the backsize it may be applied as a top coating over the backsize.

Most prior release agents have suffered from the disadvantage of having relatively low melting or softening points. This has resulted in the tendency of tapes to lose their release properties when stored or aged at elevated temperatures since release is lost above the softening point. This has produced hard unwind properties in such tapes and has created storage problems for the user.

Accordingly, it is an object of the present invention to provide a new type of release agent of relatively high melting point which overcomes the prior art disadvantage discussed above.

Another object of the invention is the provision of a new class of release agents which provide strong anchorage to tape backings yet possess excellent release characteristics.

A further object of the invention is the provision of pressure-sensitive adhesive tapes having good unwind properties after storage at elevated temperatures due to the presence in such tapes of a new and improved release material.

Additional objects, if not specifically set forth herein, will be readily apparent to one skilled in the art from the following detailed description of the invention.

Figure 1:
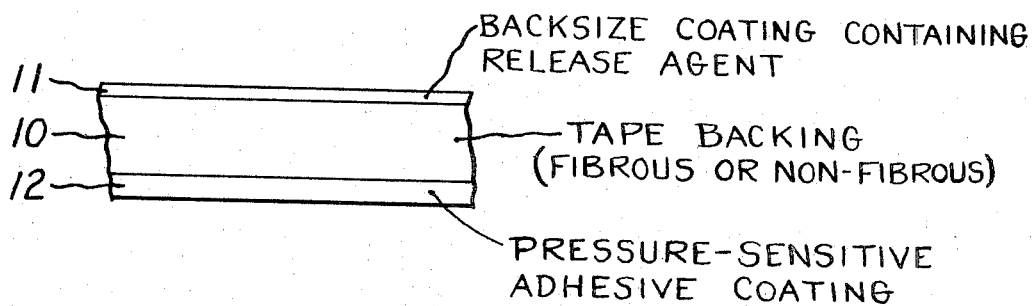
FIGURE 1 represents a cross section of a pressure-sensitive adhesive tape showing the location of the release agents of the present invention.

Generally the present invention relates to a new series of release agents having low affinity for adhesives commonly employed in pressure sensitive tapes, and thus useful as components in backsizes. These are copolymers of long, straight chain alkyl maleamic acids with vinyl co-monomers such as styrene, vinyl acetate, ethyl acrylate, methyl methacrylate, etc. The alkyl maleamic acids are prepared by reaction of maleic anhydride with a straight chain alkyl amine, having a chain length of 16 or more carbon atoms. Although composition of the copolymer can be varied, ratios of 25 to 60 mole percent alkyl maleamic acid are preferable. As the alkyl straight chain is the active principle providing release, use of lower levels requires a corresponding increase in the amount of release agent needed in a given backsize. Compositions of over 50 percent alkyl maleamic acid are difficult to obtain because of the relatively low reactivity of these monomers towards copolymerization. Further, the co-monomer must provide a polar pendant group to anchor the polymeric release agent to the paper or film backing, and so must be present in appreciable concentration. The 1 to 1 copolymers appear optimum.

The following examples are illustrative of the type of release agent referred to above:

Example 1

37 g. of octadecyl amine were dissolved in 300 ml. dry toluene under a nitrogen atmosphere. The temperature of the solution was brought to 70° C., and 13 g. of maleic anhydride added. The resultant yellow solution was kept at 80° C. for two hours. The solids at this time were a white powder which melted sharply at 102–103° C., and whose infrared spectrum was in accord with the assigned structure of octadecyl maleamic acid, with essentially no free anhydride present. To this solution was added 1 g. of benzoyl peroxide, then, with stirring, 22 g. of styrene monomer, dropwise. A temperature of 80° C. was maintained for 4 hours. Solvent and unreacted styrene was removed by steam distillation, and the residue dried in vacuo at 50° C. This resulted in a waxy, white powder which softened and melted without appreciable decomposition at 110–125° C.

A two percent (by wt.) solution of the above copolymer in toluene was applied as a 2-mil coating to a clean glass plate, and allowed to dry, leaving a clear, hard film. A standard reference pressure-sensitive adhesive tape.[1] employing a rubber-resin adhesive, was applied using a 4 lb. roller. Release of 150 g./inch was obtained, as compared with 600 g./inch adhesion to glass. After this application the sample of tape retained an adhesion to glass of 600 g./inch, showing no pickoff.

*Example 2*

The above preparation of octadecyl maleamic acid was repeated, and the product copolymerized with 20.5 g. of ethyl acrylate as above. The resultant copolymer was a fluffy, white powder which melted at 98–116° C. A 2% solution in 60/40 toluene/isopropanol was coated on glass, drying to a cloudy film which had a release of 175 g./inch from the reference tape, which then retained an adhesion of 610 g./inch to glass. Clearer films were obtained using methyl isobutyl ketone as solvent.

*Example 3*

Another identical preparation of octadecyl maleamic acid was copolymerized with 18.5 g. glacial acrylic acid. The copolymer was insoluble in hot toluene. It was recrystallized from tetrahydrofuran, yielding white crystals, M.P. 110–130° C. Clear hard films were obtained on glass from 2% 2/1 methyl ethyl ketone/dimethyl acetamide. Release from the reference tape was 150 g./inch, with a retention of adhesion of 575 g./inch, showing only slight pickoff.

*Example 4*

The above preparation of octadecyl maleamic acid was repeated, and the product copolymerized with 20 g. of methyl methacrylate. The copolymer was precipitated by cooling the toluene solution, then pouring into cold methanol. White, fluffy crystals, melting at 105–110° C. were obtained. A 2% solution in 1/1 toluene/methyl ethyl ketone left clear, hard films on glass. This film had a release of 150 g./inch from the reference tape, with retention of 605 g./inch adhesion to glass.

*Example 5*

The preparation of octadecyl maleamic acid was repeated, and the product copolymerized with 22 g. of N-vinyl pyrrolidone. The cooled toluene solution was poured into cold methanol, causing the copolymer to precipitate as a waxy, orange powder, melting at 90–105° C. after vacuum drying at room temperature for 16 hours. Good films were obtained on glass from a 2% solution in toluene, having a release of 190 g./inch from the reference tape, which retained an adhesion to glass of 580 g./inch.

The solution used to coat glass in Examples 1 through 5 were applied as topsizes to crepe masking tapes having a permanently tacky pressure-sensitive rubber-resin adhesive on the reverse side. A coating of a water and solvent resistant backsize[2] was used beneath the topsize coat. The tapes were wound into rolls, and tested for release of adhesive from topsize, and for adhesion to glass. These tests were repeated after subjection of such rolls to 16 hours at 150° F., 7 days at 150° F., and 7 days at 150°

---

[1] The standard reference pressure-sensitive adhesive tape referred to above is a saturated creped paper backed tape having a mass of the following formulation:

| | Percent |
|---|---|
| Pale crepe rubber | 41 |
| Hydrogenated glycerol abietate | 31 |
| Oil soluble heat reactive phenolic | 7 |
| Zinc oxide | 20 |
| Antioxidants | 1 |

[2] Backsize was formulated as:

| | Percent |
|---|---|
| Short oil alkyd | 80 |
| Butylated melamine-formaldehyde | 10 |
| Carboxylated polyvinyl chloride-acetate | 10 |

F. in moisture saturated air. The values obtained, in g./inch:

| | Example | | | | | No Topsize |
|---|---|---|---|---|---|---|
| | 1 | 2 | 3 | 4 | 5 | |
| No Aging: | | | | | | |
| Release | 175 | 200 | 220 | 190 | 200 | 600 |
| Adhesion | 1,300 | 1,300 | 1,300 | 1,300 | 1,300 | 1,300 |
| 150° F., 16 hrs.: | | | | | | |
| Release | 200 | 220 | 250 | 220 | 225 | 800 |
| Adhesion | 1,300 | 1,300 | 1,250 | 1,275 | 1,300 | 1,300 |
| 150° F., 7 days: | | | | | | |
| Release | 220 | 250 | 280 | 250 | 250 | 1,200 |
| Adhesion | 1,250 | 1,250 | 1,200 | 2,200 | 1,225 | 1,200 |
| 150° F., 7 days, High Humidity: | | | | | | |
| Release | 250 | 280 | 300 | 280 | 275 | 1,250 |
| Adhesion | 1,200 | 1,200 | 1,200 | 1,200 | 1,180 | 1,300 |

As a variant in procedure, the release agents prepared in Examples 1 through 5 were added at 5% on solids to said backsize used to impart water and solvent repellency. Other backsizes may be formulated from alkyd, urea-formaldehyde, melamine-formaldehyde, and numerous other resins commonly used in coatings. Repetition of the above tests led to the following results, in g./inch:

| | Example | | | | | No Release Agent |
|---|---|---|---|---|---|---|
| | 1 | 2 | 3 | 4 | 5 | |
| No Aging: | | | | | | |
| Release | 280 | 320 | 400 | 300 | 300 | 600 |
| Adhesion | 1,350 | 1,350 | 1,350 | 1,350 | 1,350 | 1,350 |
| 16 hrs., 150° F.: | | | | | | |
| Release | 300 | 350 | 400 | 320 | 300 | 800 |
| Adhesion | 1,350 | 1,325 | 1,325 | 1,350 | 1,325 | 1,250 |
| 7 days, 150° F.: | | | | | | |
| Release | 350 | 380 | 450 | 360 | 320 | 1,250 |
| Adhesion | 1,350 | 1,350 | 1,350 | 1,325 | 1,300 | 1,400 |
| 7 days, 150° F., High Humidity: | | | | | | |
| Release | 350 | 400 | 500 | 400 | 380 | 1,400 |
| Adhesion | 1,375 | 1,350 | 1,375 | 1,350 | 1,300 | 1,400 |

It is evident that these release agents may be used to advantage either as a component of, or a coating upon, backsizes commonly used in pressure sensitive adhesive tapes having paper backings.

*Example 6*

37 g. of octadecyl amine was dissolved in 250 ml. of dry toluene under a nitrogen stream. The temperature was brought to 55° C. and 13 g. maleic anhydride added, causing the temperature to rise to 80° C. This was maintained for 2 hours, at which point 1 g. of benzoyl peroxide was added, followed by 17.5 g. inhibitor-free vinyl acetate, dropwise. A temperature of 80° C. was maintained for 4 hours. The solvent was evaporated leaving the copolymer as a white powder, melting at 110–115° C. Five g. of this release agent were melted and dripped into 100 g. distilled water of 85° C., containing 1 g. of a dispersing agent, Ethomeen 18/20 (Armour Chemical Division), with vigorous stirring. A stable dispersion resulted which was used as a topsize over a backsized paper masking tape, which had the same rubber-resin adhesive as the standard reference tape described under Example 1 supra, on the reverse side. The following values of release from backsize and adhesion to glass are in g./inch:

| | Example | No Topsize |
|---|---|---|
| No Aging: | | |
| Release | 700 | 1,800 |
| Adhesion | 2,100 | 2,100 |
| 16 hrs., 150° F.: | | |
| Release | 700 | 1,750 |
| Adhesion | 2,050 | 2,100 |
| 7 days, 150° F.: | | |
| Release | 800 | 2,000 |
| Adhesion | 2,025 | 2,000 |
| 7 days, 150° F., High Humidity: | | |
| Release | 800 | 2,150 |
| Adhesion | 2,000 | 2,000 |

This release agent is suitable for use in water-based systems.

Example 7

To 1 lb. dry benzene under nitrogen was added 137 g. hexadecyl amine and 55 g. maleic anhydride. The temperature was brought to 80° C., and maintained for 2 hours. 2.5 g. benzoyl peroxide was added, and 90 g. styrene dripped in, with vigorous stirring, over a 1½ hour period. One-tenth g. benzoyl peroxide was added and the solution refluxed for 3 hours. After cooling, the solution was poured into 3 liters cold methanol, causing the copolymer to precipitate as a waxy, yellow-white powder which melted at 100–105° C.

A 2% solution of this copolymer in toluene was coated on cellulose acetate film using an 0.005" wire wound bar, yielding a clear film of a thickness of approximately 0.05 oz./sq. yd. A polyacrylate pressure sensitive adhesive was applied to the reverse side of the film, dried, and rolls of tape wound. The following data was obtained:

|  | Release Agent, g./in. | No Release Agent, g./in. |
| --- | --- | --- |
| No Aging: |  |  |
|   Release, Backsize | 200 | 800 |
|   Adhesion, Glass | 1,200 | 1,200 |
| 16 hrs., 150° F.: |  |  |
|   Release, Backsize | 300 | 1,000 |
|   Adhesion, Glass | 1,200 | 1,200 |
| 7 days, 150° F.: |  |  |
|   Release, Backsize | 300 | 1,200 |
|   Adhesion, Glass | 1,150 | 1,100 |
| 7 days, 150° F., High Humidity: |  |  |
|   Release, Backsize | 500 | 1,200 |
|   Adhesion, Glass | 1,100 | 1,100 |

Example 8

The release agent was prepared as described in Example 1. A 2% solution in 7/1 toluene/dimethylacetamide was applied to cellophane film using a 0.005" wire wound bar, leaving a clear coating, 0.03–0.05 oz./sq. yd. An unfilled rubber-resin pressure-sensitive adhesive was applied to the reverse side of the cellophane film and dried to a permanently tacky coat. Rolls of tape were wound, and the following data obtained, in g./inch:

|  | Release Agent | No Release Agent |
| --- | --- | --- |
| No Aging: |  |  |
|   Release, Backsize | 400 | 800 |
|   Adhesion, Glass | 1,300 | 1,300 |
| 16 hrs., 150° F.: |  |  |
|   Release, Backsize | 400 | 1,000 |
|   Adhesion, Glass | 1,300 | 1,300 |
| 7 days, 150° F.: |  |  |
|   Release, Backsize | 400 | (¹) |
|   Adhesion, Glass | 1,200 | (¹) |
| 7 days, 150° F., High Humidity: |  |  |
|   Release, Backsize | 400 | (¹) |
|   Adhesion, Glass | 1,000 | (¹) |

¹ Cannot be unwound.

Example 9

A sample of 150 g. of the release agent whose preparation was described in Example 1 was dissolved in 150 g. of morpholine at 90° C. with rapid stirring. 1200 g. distilled water was added slowly at 80–90° C. with continued high speed stirring. A homogeneous colloidal dispersion was formed which was quite stable to separation after cooling. An infrared spectrum of the solids indicated that the release agent was present entirely as its morpholine salt. This solution was added to a water-based backsize, diluting the release agent to 2½% by weight. A typical general purpose masking tape was prepared using this backsize coating and a filled rubber-resin pressure sensitive adhesive on the reverse side of a creped paper backing. The following results were obtained, in g./inch:

|  | Above Release Agent | 2½% Polyvinyl Stearate, a typical release agent, melting point 50° C. |
| --- | --- | --- |
| No Aging: |  |  |
|   Release, Backsize | 300 | 350 |
|   Adhesion, Steel | 1,400 | 1,400 |
| 16 hrs., 150° F.: |  |  |
|   Release, Backsize | 300 | 400 |
|   Adhesion, Steel | 1,400 | 1,400 |
| 7 days, 150° F.: |  |  |
|   Release, Backsize | 300 | 500 |
|   Adhesion, Steel | 1,350 | 1,300 |
| 7 days, 150° F., High Humidity: |  |  |
|   Release, Backsize | 400 | 600 |
|   Adhesion, Steel | 1,400 | 1,300 |

The comparison with a typical release agent in the same application illustrates the improvement in retention of good release from backsize and of original adhesion that is realized by the use of the high melting alternating, one-to-one copolymers of long chain alkyl maleamic acids with common vinyl co-monomers. The facile reaction of these copolymers with amines to form salts makes possible stable water dispersions which are highly useful in backsize formulations for pressure sensitive adhesive tapes.

As illustrated by the foregoing specific examples, octadecyl and hexadecyl amines have been found suitable in reaction with maleic anhydride to form the maleamic acid monomers required as a component of the release agent copolymers of the present invention. Higher homologs such as eicosyl amine would be suitable but generally are not available in commercial quantity at reasonable cost. Lower homologs such as tetradecyl, dodecyl, etc., amines when reacted to form the maleamic acid monomers do not form copolymers having sufficient release from pressure sensitive adhesives to be useful.

The vinyl co-monomers used with the maleamic acid monomers to form the release agent copolymers of the present invention are those which bear a pendant group which can be strongly absorbed on the surface of a tape backing. The vinyl co-monomer must be polar and compact in structure in order to gain a high melting point in the copolymer. Suitable vinyl co-monomers are styrene, vinyl acetate, ethyl acrylate, acrylic acid, acrylamide, methyl methacrylate and N-vinyl pyrrolidone.

Copolymerization in solution as illustrated above appears preferable but any of the common reaction procedures may be substituted if desired. The yields in solution polymerization have been found to be excellent, ranging from 88% to 98% recovered copolymer. A slight excess of the vinyl co-monomer is preferably used and any unreacted remnants are removed with the solvent.

Figure 2:
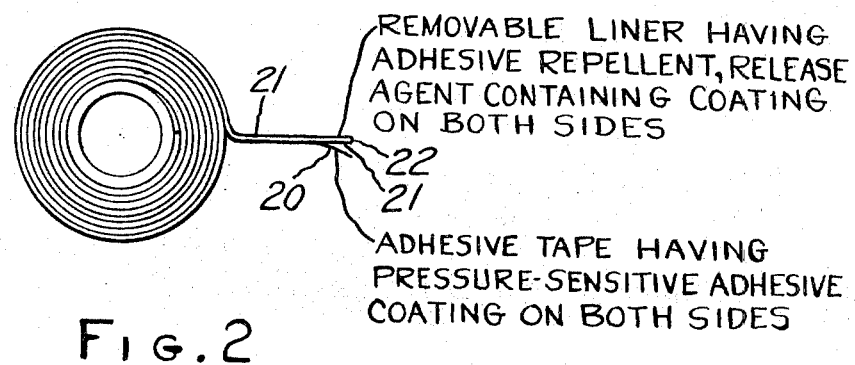
FIGURE 2 illustrates a roll of double-face pressure-sensitive adhesive tape showing a liner inter-rolled with the tape, said liner carrying the release agents of the present invention.

As illustrated in the drawings, the pressure-sensitive tape 10 may carry the release agents of the present invention coated on the surface of the tape 11 opposite the adhesive coating 12 or where a double-face tape 20 is used as shown in FIGURE 2, the release coat 21 may be on the surface of the liner 22 inter-rolled with the tape 20.

Obviously, many variations and modifications may be made without departing from the spirit and scope of the invention hereinabove described, so that only such limitations should be imposed as may be contained in the appended claims.

We claim:
1. A pressure-sensitive adhesive tape comprising:
  (a) a flexible backing member;
  (b) a pressurse-sensitive adhesive coating on one surface of said backing member; and
  (c) a release coating on the opposite surface of said backing member, said release coating containing as the active release component thereof a copolymer of an N-substituted long chain alkyl maleamic acid having a chain length of at least 16 C atoms with a vinyl co-monomer having a polar pendant group, the mol ratio of alkyl maleamic acid to vinyl co-monomer ranging from 1:3 to 3:2.

2. A pressure-sensitive adhesive tape as in claim 1 wherein said vinyl co-monomer is selected from the group consisting of styrene, vinyl acetate, ethyl acrylate, acrylic acid, acrylamide, methyl methacrylate and N-vinyl pyrrolidone.

3. A pressure-sensitive adhesive tape as in claim 1 wherein said mol ratio is 1:1.

4. A pressure-sensitive ahesive tape as in claim 1 wherein said alkyl maleamic acid is the reaction product of maleic anhydride and a long straight chain alkyl amine having a chain length of at least 16 C atoms.

References Cited
UNITED STATES PATENTS

| | | | |
|---|---|---|---|
| 2,822,290 | 2/1958 | Webber | 117—68.5 |
| 2,876,894 | 3/1959 | Dahlquist et al. | 206—59 |
| 2,923,646 | 2/1960 | Jordan | 117—155 |
| 3,107,227 | 10/1963 | Sven et al. | 260—45.2 |
| 3,111,425 | 11/1963 | Sheehan | 117—64 |
| 3,240,330 | 3/1966 | Christman | 206—59 |

WILLIAM D. MARTIN, *Primary Examiner.*

W. D. HERRICK, *Assistant Examiner.*